Aug. 28, 1951   V. H. WILEY   2,565,900
HIGH-FREQUENCY DUMMY ANTENNA AND POWER INDICATOR
Filed July 8, 1946   2 Sheets-Sheet 1
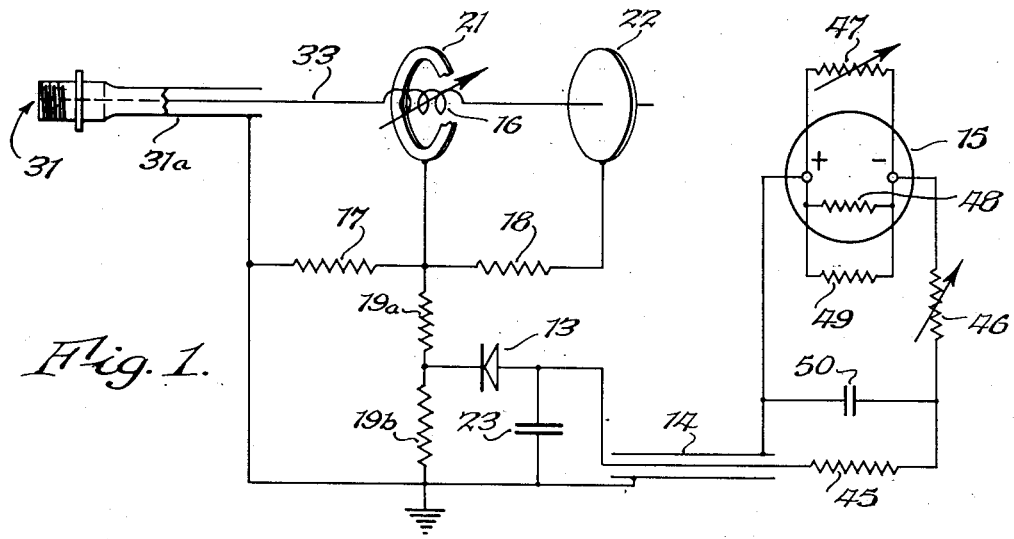
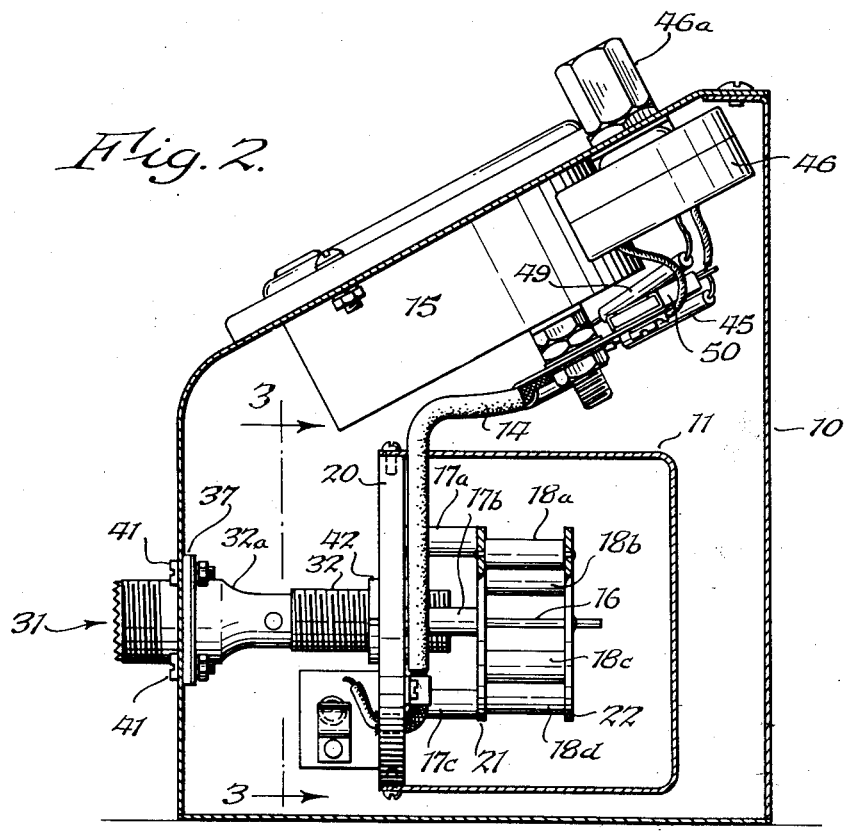
INVENTOR
Verlis H. Wiley
BY
ATTORNEY Aug. 28, 1951 V. H. WILEY 2,565,900
HIGH-FREQUENCY DUMMY ANTENNA AND POWER INDICATOR
Filed July 8, 1946 2 Sheets-Sheet 2
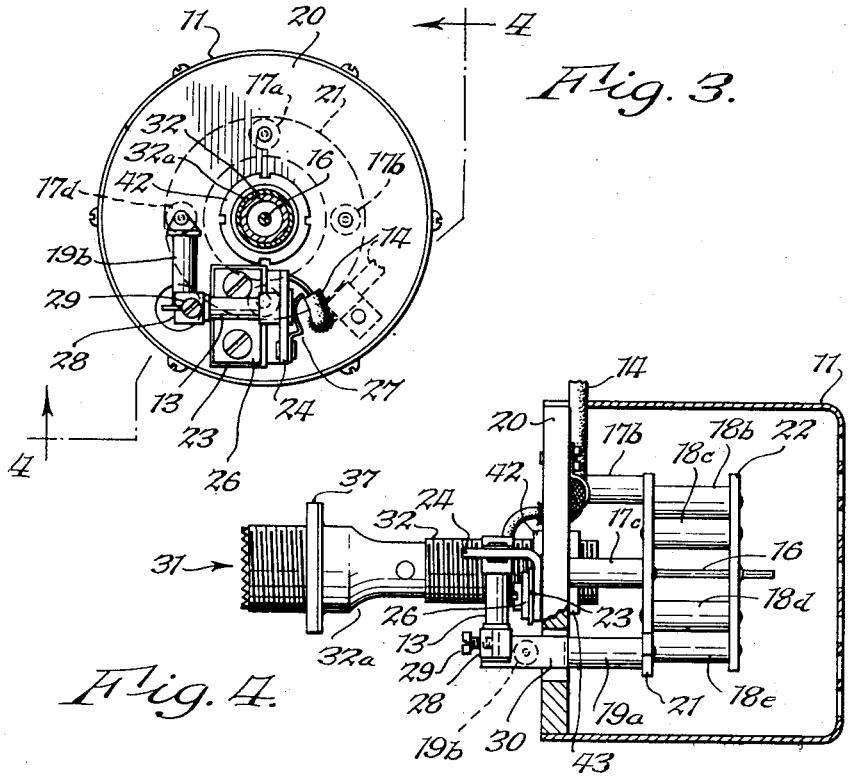
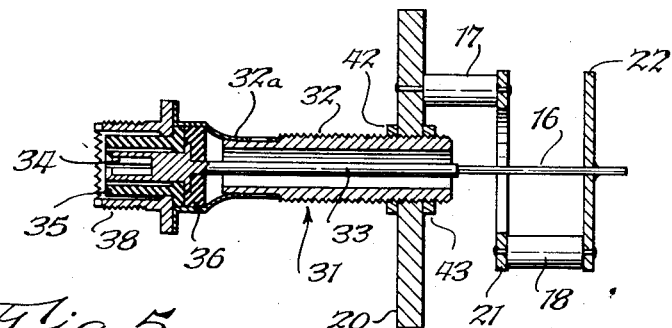
INVENTOR
Vertis H. Wiley
BY
ATTORNEY Patented Aug. 28, 1951

2,565,900

UNITED STATES PATENT OFFICE 2,565,900

HIGH-FREQUENCY DUMMY ANTENNA AND POWER INDICATOR

Verlis H. Wiley, Kenmore, N. Y., assignor, by mesne assignments, to Sylvania Electric Products Inc., New York, N. Y., a corporation of Massachusetts Application July 8, 1946, Serial No. 681,900

9 Claims. (Cl. 178—44)

This invention relates to a dummy antenna and power indicator, more particularly designed and intended for use in the so-called very high frequency (V. H. F.) range.

In the manufacture of transmitters and similar apparatus it is desirable to have measuring and testing instruments, particularly where quantity production of the apparatus is contemplated, by the use of which the inspectors and testers can determine quickly and easily whether the transmitter is properly aligned and adjusted and is operating as it should.

Such an instrument should be accurate and reliable, rugged in operation, and should be capable of operation by the type of personnel likely to be found on the assembly lines and in the test booths of radio manufacturing companies. It should not require the services of laboratory technicians or engineers to operate it with reliable results.

It is an object of this invention to provide such a dummy antenna and power indicator, particularly for operation on very high frequencies.

It is a further object of this invention to provide such a dummy antenna and power indicator which may be relatively easily and simply adjusted, and once adjusted will retain its adjustment indefinitely, and which may be readjusted to different frequencies or for different operating conditions simply and quickly, and which will retain its new adjustment.

It is a further object of this invention to produce a dummy antenna and power indicator in which the resistance component reflected from the instrument into the apparatus to be measured may be closely held to a predetermined value, for example, 50 ohms, and in which the reactive component may be held to a smaller value, for example, less than 10 ohms, at any frequency over the operating range, for instance, 100 to 156 megacycles.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a simplified schematic circuit diagram of the dummy antenna and power indicator in accordance with my invention, Fig. 2 is a sectional elevation of the instrument itself, Fig. 3 is a section on lines 3—3 of Fig. 2, Fig. 4 is a section on lines 4—4 of Fig. 3, and Fig. 5 is a partial sectional view showing especially the input terminal.

The instrument according to my invention is essentially a direct reading high frequency wattmeter designed to operate at a 50-ohm load in the 100 to 156 megacycle band. No external power source is required for its operation except the apparatus under measurement. This is accomplished by the use of a high frequency crystal rectifier, and its required circuit components.

Essentially the instrument includes a tuned circuit tuned to resonance at a predetermined frequency, in this instance at 125 megacycles, and provided with a known resistance load, in this instance, of 50 ohms. This is indicated in Fig. 1, in which 33 is the high side of the input conductor and 31a the ground side thereof.

The circuit comprises inductance 16, which is preferably variable for tuning, certain inherent capacities not indicated in the diagram, but which will be understood to exist in the circuit, some of them being unavoidable, and resistances 17 and 18 in series between 16 and ground.

From the common terminal of resistances 17 and 18 additional resistances 19a and 19b are connected in series to ground and rectifier 13 connected to the common point of resistors 19a and 19b. A connection is then taken from the output terminal of the rectifier, by-passed by condenser 23 to ground, through series resistances 45 and 46, one of which, as 46, may be adjustable, to the meter input.

Meter 15 is preferably a direct current microammeter having a suitable scale reading, for instance, from 0 to 100. Shunt resistances 47, 48, and 49 may be provided, one of which may be adjustable, as 47. For ease of adjustment, resistances 47 and 46 may be provided with adjusting knobs or shafts extending through the instrument panel, and after the adjustments have been made to calibrate the instrument for its particular work, these adjusting shafts may be covered by caps such as 46a, which are paint staked in position, to prevent accidental disturbance of the adjustment.

The entire instrument is preferably contained within metal box or container 10, which may be perforated in places to provide for ventilation, and which shields the instrument from all external fields.

Container 10 may have a slopping upper front portion in which may be mounted meter 15, with the adjusting shafts of resistors 46 and 47 projecting out of the front panel at the upper left and right-hand corners, as indicated in Fig. 2 (see cap 46a). Input terminal 31 may project through an opening in the lower portion of the front panel and be held in place by suitable screws 41 engaging the front panel and flange 37 on the input terminal assembly.

The input terminal assembly includes the inner conductor 33, which terminates at its outer end in spring socket 34 and projects inwardly beyond the shielding portion of the input terminal assembly to form inductance 16. This inner conductor 33 is positioned within metallic sleeve 32, provided with screw threads, by means of which the entire input assembly may be moved in or out with respect to the front panel by appropriate adjustment of nuts 42 and 43.

The outer end of threaded portion 32 may carry bell housing 32a, which engages metallic bushing 38, likewise provided with threaded portions and with a serrated outer edge, and inner conductor 33 may be held in position by means of insulating bushings 35 and 36.

Mounted upon threaded member 32 there is provided metal end plate 20, upon which there are mounted the resistance elements. Secured to the periphery of plate 20 there is preferably provided an interior shielding can 11 serving to isolate the apparatus within the shielding can from other apparatus within the exterior housing of the instrument itself.

Mounted upon plate 20, and extending therefrom parallel to inner conductor 33, I provide a plurality of resistances 17a, 17b, 17c, etc. The outer ends of these resistors are connected to intermediate metal ring 21, and in a similar manner an additional series of resistors 18a, 18b, 18c, 18d, etc., is mounted on the opposite side of ring 21, extending outwardly therefrom parallel to inner conductor 16. The outer ends of these resistors are mounted on outer end plate 22.

The end plates and ring are made of heavy metallic conductors so that their resistance in the circuit is negligible, and conductor 16 extends through ring 21, not contacting it, but is electrically connected to plate 22.

Ring 21 is at the potential of the common point of resistors 17 and 18, and connection is made from ring 21 to one terminal of rectifier 13 through resistor 19a, having one end secured to ring 21 and its other end connected to connecting strip 30, passing through an opening in end plate 20. The outer end of connecting strip 30 carries socket 28 provided with set screw 29 for receiving and holding one end of a cartridge type rectifier, the other end of which is engaged by spring clip 27 secured to angle plate 24, which is turn is secured on end plate 20, but insulated therefrom by a strip of mica (not shown) or other suitable insulator interposed between plate 24 and end plate 20.

Angle plate 24 may be secured to end plate 20 by suitable bolts passing through clamping plate 26 insulated from angle plate 24 by a sheet of mica 23. Resistor 19b may be connected from one terminal of rectifier 13 to end plate 20, which is at ground potential. Rectified current may be taken through shielded conductor 14 to the meter assembly.

While in the circuit diagram resistances 17 and 18 are indicated as single resistances, actually they are made up of a number of resistances in parallel; for example, resistance 18 is made up of eight resistances of 270 ohms + or − 5%, connected in parallel, giving a total resistance of 33.75 ohms. Resistance 17 is made up of four resistors of 68 ohms + or − 5%, giving an effective value of 17 ohms, the total value of both resistances in series thus amounting to 50 ohms, within the limits of resistor variation. These resistances must have low inductance. If wire-wound, they should be wound non-inductive. I prefer to use the carbon type.

In mounting the resistors, the leads are clipped to a length not exceeding the thickness of ring 21 and end plate 22 and the resistors mounted with the clipped leads soldered in openings in the plate, this keeping the inductance at a minimum. The reason for splitting the resistance of the tuned circuit into two series parts is to keep the capacity across the resistor element of low value in order that the reactive value off resonance may be low at the input. This tends to give full effect of the 50 ohms to damp or reduce the "Q" of the tuned circuit, thus keeping the reactive value low at other frequencies in the band.

The splitting of the resistors into two groups also reduces the effective capacity to approximately half of what it would otherwise be, since the capacities of the two groups of resistances are effecitvely in series. Also, it provides a step-down ratio for the indicator, reducing the loading effect of the indicator on the tuned circuit and on the output of the transmitter. By-pass condenser 50 is provided across the meter circuit to insure that a large pecentage of the R. F. voltage is applied across the rectifier.

To tune the circuit, inner conductor 16 is electrically connected to end plate 22 but is not soldered thereto. Nuts 42 and 43 are then adjusted to move the input terminal assembly in or out of end plate 20. This decreases or increases inductance 16, which is determined by the length of unshielded conductor 16 between the inner end of sleeve 32 and end plate 22. When exact resonance is obtained, nuts 42 and 43 are paint staked in position and conductor 16 is soldered to end plate 22.

The procedure for calibrating the instrument is as follows:

The following equipment is necessary: a high frequency "Q" meter, Boonton Radio Corporation model 170A or the equivalent, a suitable coupling circuit to be used with the "Q" meter to enable an accurate check of reactive component and effective loading at the middle and two ends of the band, a Weston wattmeter model 310 or the equivalent, and a low frequency power source capable of delivering 15 watts into a 50 ohm load. This source may conveniently be the 60 cycle 110 volt line with a "Variac" to the wattmeter.

The first adjustment made is the adjustment for zero reactance (resonance) at 125 megacycles, in the example given. This adjustment is made before the shielded load assembly is mounted into the meter box. This assembly includes the load and meter resistances, the main base plate 20, the rectifier, the input terminal assembly, and shield 11.

The inner conductor 16, as previously stated, will be electrically connected to end plate 22, but not soldered thereto. It is essential that this electrical connection be good. A 5-foot transmission line is then connected to the input terminal assembly, and measurements are made at the input end of this line. The "Q" meter is turned on and the coupling circuit attached thereto. The "Q" meter should be allowed to warm up at least fifteen minutes to reduce drift and zero shift.

It is then tuned to 125 megacycles, and the main coil of the coupling circuit resonated with the secondary on open circuit. A short-circuiting strip is then placed across the secondary probe terminals, and the secondary circuit tuned. Due to the load reflected to the main coil, the secondary will be resonant at the minimum "Q" reading.

The short-circuiting strip is then replaced with the input end of the 5-foot transmission line to the dummy antenna, and the secondary adjusted for resonance. If the reading is the same as with the short-circuiting strip in place, the reactive component is zero. If more capacity is needed, then the dummy antenna is capacitive. If less capacity is needed, then the antenna is inductive.

To obtain exact resonance, nuts 42 and 43 are adjusted, moving the input assembly in or out, as previously stated. After the correct adjustment is obtained, the lock nuts are tightened and paint staked. After zero adjustment is made at 125 megacycles, the reactive component is checked at 100 and 156 megacycles to determine more accurately the zero setting at 125 megacycles. The shield 11 may then be removed and inner conductor 16 soldered to end plate 22, the shield replaced, and the unit assembled in outer container 10.

Effective loading is checked in the same manner as the reactive component except that the "Q" meter and coupling circuit are previously calibrated to read known values of loading between 40 and 60 ohms.

The instrument is calibrated at audio frequency in watts input to the transmission line versus meter reading. It is satisfactory to use as an audio source the 60-cycle line. A Variac is connected to the line, the output of the Variac to the Weston wattmeter model 310, and the input end of the transmission line connected to the wattmeter. Voltage applied to the antenna must be carefully controlled to prevent excessive heating of the resistors.

A large capacity, preferably about 2,500 mfd., is connected from plate 24 to ground. The positive side of the capacity must be connected to ground. This capacitor provides a low impedance path across the meter circuits at 60 cycles.

The input wattage is then adjusted to exactly 5.85, and the right-hand screw-driver control on the outside of the cabinet (meter shunt adjustment) is moved until the indicating meter 15 reads exactly 30 micro-amperes.

The input wattage is now adjusted to exactly 12.15, and it is noted whether the meter reads less than or more than 50. If the meter reads less than 50, the sensitivity must be increased by adjusting left-hand screw-driver control 46a. The meter reading is then adjusted with the shunt (right-hand control, not shown) for a reading of 50. The input wattage is now reduced to 5.85. If proper correction has been obtained, the meter will read 30. If the meter reads more than 50, the sense of adjustments above recited must be reversed.

If proper adjustment has been made, the meter will read 30 with input wattage of 5.85 and 50 with input wattage of 12.15. The large capacitor connected for calibration may then be removed, the caps over the meter shunt and sensitivity control shafts placed in position and paint staked, and the instrument is ready for use and will have a reactive component measured at the input end of the 50-ohm line, of less than 8 ohms inductive reactance at 100 megacycles, zero at 125 megacycles, and less than 8 ohms capacitive at 156 megacycles.

The effective loading throughout the frequency band 100 to 156 megacycles will not be less than 50 ohms nor more than 55 ohms, and the accuracy of the meter reading between instruments and compared on any carrier frequency power within the frequency band will be one division.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In apparatus of the class described, in combination, a plurality of groups of resistors connected in series, each group comprising a plurality of resistors connected in parallel, a pair of conducting end plates arranged in spaced parallel planes on a common axis perpendicular to said planes and centrally of said end plates, said resistors being mounted between and connected at their respective outer ends to said end plates and having their inner ends connected together, an inner conductor disposed on said axis, and a shielding sleeve extending over said inner conductor for part of its length, said sleeve and inner conductor being mounted in one of said end plates, and said inner conductor being connected to the other end plate.

2. In apparatus of the class described, in combination, a plurality of groups of resistors connected in series, each group comprising a plurality of resistors connected in parallel, a pair of conducting end plates arranged in spaced parallel planes on a common axis perpendicular to said planes and centrally of said end plates, said resistors being mounted between and connected at their respective outer ends to said end plates and having their inner ends connected together, an inner conductor disposed on said axis, and a shielding sleeve extending over said inner conductor for part of its length, said sleeve extending through one end plate, and said sleeve and inner conductor being adjustably mounted thereon and said inner conductor being connected to the other end plate.

3. In apparatus of the class described, in combination, a plurality of groups of resistors connected in series, each group comprising a plurality of resistors connected in parallel, a pair of conducting end plates arranged in spaced parallel planes on a common axis perpendicular to said planes and centrally of said end plates, said resistors being mounted between and connected at their respective outer ends to said end plates and having their inner ends connected together, an inner conductor disposed on said axis and a shielding sleeve extending over said inner conductor for part of its length, said sleeve extending through one end plate and said sleeve and inner conductor being longitudinally adjustably mounted thereon, and said inner conductor being connected to the other end plate.

4. In apparatus of the class described, in combination, a plurality of groups of resistors connected in series, each group comprising a plurality of resistors connected in parallel, a pair of conducting end plates arranged in spaced parallel planes on an axis perpendicular to said plane and centrally of said end plates, said resistors being mounted between and connected at their respective outer ends to said end plates and having their inner ends connected together, an inner conductor disposed on said axis and having a shielding sleeve extending thereover for part of the length of said inner conductor, said sleeve and inner conductor being longitudinally adjustable in one of said end plates and said inner conductor being connected to the other end plate centrally thereof.

5. In apparatus of the class described, in combination, a plurality of groups of resistors connected in series, each group comprising a plurality of resistors connected in parallel, a pair of conducting end plates arranged in spaced parallel planes on a common axis perpendicular to said planes and centrally of said end plates, an intermediate conducting plate having an opening at its center disposed between said end plates and parallel thereto on the said axis, the first of said groups of resistors being mounted between and connected at their ends to one end plate and to said intermediate plate respectively, and the second of said groups of resistors being mounted between said intermediate plate and the other of the end plates and having their ends connected to said intermediate plate and to said other end plate respectively and an inductance in the form of a straight rod mounted on said axis on one of said end plates and electrically connected to the other of said end plates.

6. In apparatus of the class described, in combination, a plurality of groups of resistors connected in series, each group comprising a plurality of resistors connected in parallel, a pair of conducting end plates arranged in spaced parallel planes on a common axis perpendicular to said planes and centrally of said end plates, an intermediate conducting plate having a central opening positioned between said end plates and parallel thereto on said axis, the first of said groups of resistors being mounted between and connected at their ends to one end plate and to said intermediate plate respectively, and the second of said groups of resistors being mounted between said intermediate plate and the other of said end plates and having their respective ends connected to said intermediate plate and to said other end plate respectively, and an inductance in the form of a straight rod longitudinally adjustably mounted on one of said end plates extending along said axis and electrically connected to the other end plate.

7. In apparatus of the class described, in combination, a plurality of groups of resistors connected in series, each group comprising a plurality of resistors connected in parallel, a pair of conducting end plates arranged in spaced parallel planes on an axis perpendicular to said plane and centrally of said end plates, an intermediate conducting plate having a central opening positioned between said end plates and parallel thereto on said axis, the first of said groups of resistors being mounted between and connected at their ends to one end plate and to said intermediate plate respectively, and the second of said group of resistors being mounted between said intermediate plate and the other of said end plates and having their respective ends connected to said intermediate plate and to said other end plate respectively, and an inductance in the form of a straight rod longitudinally adjustably mounted on one of said end plates, extending along said axis and electrically connected to the other end plate, said resistances having no leads longer than the thickness of said plates, whereby the inductance is substantially concentrated in said rod.

8. In apparatus of the class described, in combination, a plurality of groups of resistors connected in series, each group comprising a plurality of resistors connected in parallel, a pair of conducting end plates arranged in spaced parallel planes on an axis perpendicular to said plane and centrally of said end plates, an intermediate conducting plate having a central opening positioned between said end plates and parallel thereto on said axis, the first of said groups of resistors being mounted between said intermediate plate and one of said end plates and having their respective ends connected to said intermediate plate and to said end plate respectively, and the second of said group of resistors being mounted between said intermediate plate and the other end plate, and an inductance in the form of a straight rod longitudinally adjustably mounted on one of said end plates extending along said axis and electrically connected to the other end plate, and having a shielding sleeve extending over said inner conductor for part of its length, said sleeve and inner conductor being mounted in one of said end plates, and the unshielded end of said inner conductor being connected to the other end plate.

9. In apparatus of the class described, in combination, a plurality of groups of resistors connected in series, each group comprising a plurality of resistors connected in parallel, a pair of conducting end plates arranged in spaced parallel planes on an axis perpendicular to said plane and centrally of said end plates, an intermediate conducting plate having a central opening positioned between said end plates and parallel thereto on said axis, the first of said groups of resistors being mounted between said intermediate plate and one of said end plates and having their respective ends connected to said intermediate plate and to said end plate respectively, and the second of said group of resistors being mounted between said intermediate plate and the other end plate, and an inductance in the form of a straight rod longitudinally adjustably mounted on one of said end plates extending along said axis and electrically connected to the other end plate, and having a shielding sleeve extending over said inner conductor for part of its length, said sleeve and inner conductor being mounted in one of said end plates, and said inner conductor being connected to the other end plate, and said resistances having no leads longer than the thickness of said plates, whereby the inductance is substantially concentrated in said rod.

VERLIS H. WILEY.

REFERENCES CITED

The following references are of record in the file of this patent:

UNITED STATES PATENTS

| Number | Name | Date |
| --- | --- | --- |
| 1,905,353 | Potter | Apr. 25, 1933 |
| 2,163,775 | Conklin | June 27, 1939 |
| 2,262,134 | Brown | Nov. 11, 1941 |
| 2,387,158 | Kozanowski | Oct. 16, 1945 |

FOREIGN PATENTS

| Number | Country | Date |
| --- | --- | --- |
| 111,536 | Australia | Sept. 13, 1940 |